March 22, 1927.
R. A. BOOKER
METHOD OF MAKING PISTON RINGS
Original Filed March 30, 1922
1,621,578
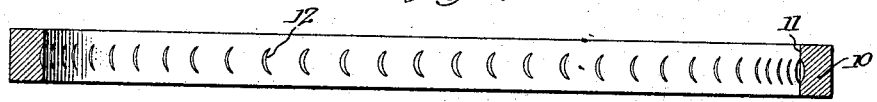
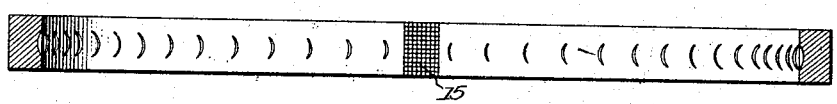
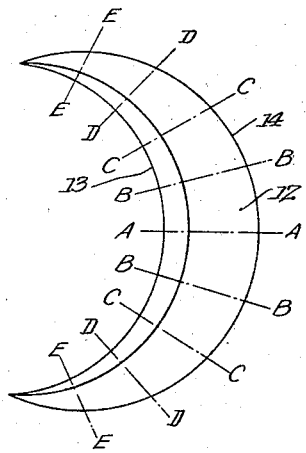
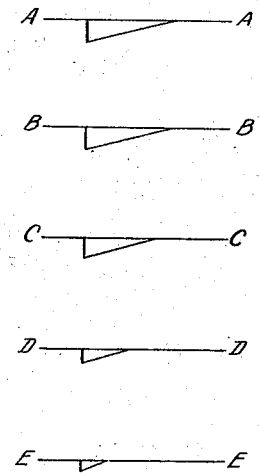
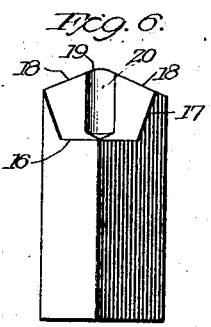
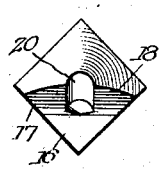
Inventor
Richard A. Booker.
By Cushman, Dyant Darby
Attorneys Patented Mar. 22, 1927.

1,621,578

UNITED STATES PATENT OFFICE.

RICHARD A. BOOKER, OF RICHMOND, INDIANA, ASSIGNOR TO RICHMOND PISTON RING CO., OF RICHMOND, INDIANA, A CORPORATION OF INDIANA.

METHOD OF MAKING PISTON RINGS.

Original application filed March 30, 1922, Serial No. 548,111. Divided and this application filed August 21, 1923. Serial No. 658,567.

This invention, which is a division of applicant's co-pending application, Serial No. 548,111, filed March 30, 1922, has been made the subject of a separate application under official requirement, and relates to a new and improved method of making piston rings, and more particularly that type of ring wherein the indentations are formed in the inner wall of the ring, before the ring is severed, so as to provide a uniform radial spring pressure when the ends are sprung apart.

Heretofore, it has been the custom to make resilient piston rings by splitting the rings and then tensioning them by hammering the interior wall thereof so as to force the split ends apart.

In my improved method, the indentations are formed before the ring is split, so as to displace the molecules over a curved line or area, in contrast to the wedge or channel impressions heretofore employed. Furthermore, by the present method, the metal is densified in the interior wall of the ring over a substantially lune shaped area, and with blows so varied circumferentially of the ring as to produce the maximum densification diametrically opposite a point where the ring is to be split, and gradually diminishing the impact of the peining tool in opposite directions from the point of greatest impact, so as to cause a uniform radial spring pressure when the ring is finally severed.

Referring to the drawings wherein is disclosed a preferred embodiment of the invention:

Fig. 1 is a horizontal sectional view showing the interior wall of a piston ring peined in accordance with my invention.

Figs. 2 and 3 are horizontal sectional views, looking at the inside of the piston ring at a point diametrically opposite to Fig. 1, and showing, respectively, the ring before and after it is split.

Fig. 4 is a diagrammatic view to illustrate the lune shaped impression formed by the peining tool on the inner wall of the ring.

Fig. 5 shows a series of cross-sectional views taken at the points indicated on Fig. 4.

Fig. 6 is a side elevation of the peining tool showing one manner of forming the peining point.

Fig. 7 is a plan view of the peining tool.

Referring to the drawings, wherein like numerals indicate like parts in the various figures, 10 indicates a circular piston ring having formed in its interior wall 11 a series of peined indentations or depressions 12 of substantially lune shape, and so formed as to make their deepest impression at the center point of the interior arc 13 of the lune, and gradually and uniformly decrease the extent of the impression along the interior arc of the lune as the same approaches the apices of that interior arc 13 and the exterior arc 14, at which point the impression coincides or becomes flush with the inner wall 11 of the ring, as best shown in Figs. 4 and 5.

The ring 10 will preferably be marked in any suitable fashion, as at 15, at some point on its inner periphery so that the peining or hammering of the ring will be such that the maximum impact will be at a point diametrically opposite this mark 15, and the impact will gradually diminish in opposite directions around the inner circumference of the ring so that the mark 15 will be approached on opposite sides by gradually diminishing peining blows.

By marking the ring in this manner the action of the peining hammer may be accurately graduated with reference to a certain point, namely the point 15, and after peining the ring will be cut at the point 15, as illustrated in Figure 3, so that severance of the ring will take place at the proper point to secure the best results and an accurate and uniform expansion.

The peining tool used to carry out my present method, is illustrated in Figures 6 and 7, and is preferably made as shown with a base 16 formed by cutting away one side of the blank 17, of which the tool is made, and said tool has its peining face 18 formed as a true conical surface sloping uniformly in all directions from its apex 19, which apex is cut away at 20, as shown by a groove, so as to give a curved base to the conical peining surface from which the lune shaped indentation will be generated upon a blow of the peining tool. This insures formation of the lune shaped indentation, heretofore described, with its greatest depth at the center of the lune and gradually decreasing from the center of its inner arc 13 toward its apices and also outwardly toward its outer arc 14.

With this tool, and following my method, the peining blow is so distributed that danger of breakage along the peining area is eliminated for the greatest depth and width of the indentation is at the center of the ring and gradually decreases and changes its direction as it approaches the edges of the ring, thus distributing the impact of the peining blow to the indented area and eliminating any stresses which tend to weaken the ring along definite lines.

It is to be understood that the method herein shown and described is to be taken as a preferred embodiment of the same, and that such changes in construction and arrangement of parts as fall within the purview of one skilled in the art may be made without departing from the spirit of the invention and the scope of the claims.

I claim:

1. The method of peining piston rings, which consists in densifying the metal in the interior wall of the ring over a substantially lune shape area so that the impression will have its greatest depth and width at the center point of the interior arc of the lune, said impression decreasing gradually and uniformly towards the apex of the interior and exterior arcs of the lune, and then splitting the ring.

2. The method of peining piston rings, which consists in densifying the metal in the interior wall of the ring over a substantially lune shaped area and with blows so varied circumferentially of the ring as to produce the maximum densification at a point opposite to where the ring is to be split, and gradually approaching the minimum at the ends so as to produce a permanently circumferentially varied distortion of the metal, and a uniformly radial spring pressure when the ring is split, and then splitting the ring.

In testimony whereof I have hereunto set my hand.

RICHARD A. BOOKER.